(12) United States Patent
Pfeffer et al.

(10) Patent No.: US 8,486,366 B2
(45) Date of Patent: Jul. 16, 2013

(54) ACTIVATION OF REACTIVE COMPOUND WITH CATALYST

(75) Inventors: Henry A. Pfeffer, Mercerville, NJ (US);
Timothy A. Holtz, N. Tonawanda, NY (US); Rodney J. Truce, Graceville (AU);
JoAnn Pacinelli, Pittsburgh, PA (US);
Luke F. Wilkinson, Tingalpa (AU)

(73) Assignees: FMC Corporation, Philadelphia, PA (US); Indigo Technologies Group Pty Ltd, Brisbane, Qld (AU)

( * ) Notice: Subject to any disclaimer, the term of this patent is extended or adjusted under 35 U.S.C. 154(b) by 0 days.

(21) Appl. No.: 13/387,932

(22) PCT Filed: Jul. 29, 2010

(86) PCT No.: PCT/US2010/043733
§ 371 (c)(1),
(2), (4) Date: Apr. 12, 2012

(87) PCT Pub. No.: WO2011/017194
PCT Pub. Date: Feb. 10, 2011

(65) Prior Publication Data
US 2012/0189520 A1 Jul. 26, 2012

Related U.S. Application Data

(60) Provisional application No. 61/262,457, filed on Nov. 18, 2009.

(30) Foreign Application Priority Data

Aug. 3, 2009 (AU) ................... 2009903603

(51) Int. Cl.
*B01D 53/34* (2006.01)
*B01D 53/50* (2006.01)
*B01D 53/56* (2006.01)
*B01D 53/72* (2006.01)
*C01B 15/01* (2006.01)
*C01B 15/037* (2006.01)

(52) U.S. Cl.
USPC ........ 423/584; 423/210; 423/235; 423/242.1; 423/245.1

(58) Field of Classification Search
USPC .................... 423/210, 235, 242.1, 245.1, 584
See application file for complete search history.

(56) References Cited

U.S. PATENT DOCUMENTS 2,332,181 A 10/1943 Soule-Mathieson
3,991,167 A 11/1976 Depommier
4,213,944 A 7/1980 Downey et al.

(Continued)

OTHER PUBLICATIONS

Altman et al. Indigo MAPSystem—11th annual Electric Power Conference, May 12-14, 2009, 14 pages.

(Continued)

*Primary Examiner* — Timothy Vanoy
(74) *Attorney, Agent, or Firm* — FMC Corporation

(57) ABSTRACT

Concentrated aqueous hydrogen peroxide or another reactive compound in a liquid carrier is activated by atomization and contact with a suitable catalyst that is concurrently atomized in a carrier liquid. Concentrated hydrogen peroxide and a hydrogen peroxide activation catalyst are atomized into a droplet spray for catalytic activation of the hydrogen peroxide in this invention, useful for treatment of a combustion flue gas containing contaminants such as $NO_x$ and/or Hg.

20 Claims, 2 Drawing Sheets

U.S. PATENT DOCUMENTS

| | | |
|---|---|---|
| 4,574,076 A | 3/1986 | Castrantas |
| 4,783,325 A | 11/1988 | Jones |
| 4,834,852 A | 5/1989 | Wabner |
| 5,120,508 A | 6/1992 | Jones |
| 5,366,711 A | 11/1994 | von Wedel |
| 5,637,282 A | 6/1997 | Osborne et al. |
| 5,670,122 A | 9/1997 | Zymansky et al. |
| H1948 H | 3/2001 | Rusek et al. |
| 6,239,095 B1 | 5/2001 | Bertsch-Frank et al. |
| 6,645,450 B2 | 11/2003 | Stoltz |
| 6,676,912 B1 | 1/2004 | Cooper et al. |
| 6,793,903 B1 | 9/2004 | Parrish |
| 6,955,799 B1 | 10/2005 | Parrish |
| 6,969,486 B1 | 11/2005 | Cooper et al. |
| 7,112,309 B2 | 9/2006 | Stoltz et al. |
| 7,156,957 B1 | 1/2007 | Parrish |
| 7,404,938 B2 | 7/2008 | Parrish |
| 7,514,053 B2 | 4/2009 | Johnson |
| 7,550,123 B2 * | 6/2009 | Temple et al. ............... 423/210 |
| 7,582,271 B2 * | 9/2009 | Parrish et al. ............ 423/243.01 |
| 7,815,879 B2 * | 10/2010 | Temple et al. ............... 423/210 |
| 2003/0031621 A1 | 2/2003 | Gravitt et al. |
| 2004/0197252 A1 | 10/2004 | Parrish |
| 2005/0019229 A1 | 1/2005 | Parrish |
| 2005/0214187 A1 | 9/2005 | Johnson |
| 2008/0213148 A1 | 9/2008 | Parrish et al. |
| 2008/0241030 A1 | 10/2008 | Parrish et al. |
| 2009/0130047 A1 | 5/2009 | Weiss et al. |

OTHER PUBLICATIONS

Hecht et al. Pneumatic Atomization ILASS Americas 20th Annual Conference on Liquid Atomization, May 2007, 25 pages.
Schlick MultiComponent Nozzle Technical Brochure 2001, 6 pages.
Kirk Othmer Encyclopedia of Chemical Technology, Hydrogen Peroxide—Wiley, online Ed. 2001, pp. 1-58.
Ullmann's Encyclopedia of Industrial Chemistry Hydrogen Peroxide 5th Ed. 2002, pp. 443-467.

* cited by examiner

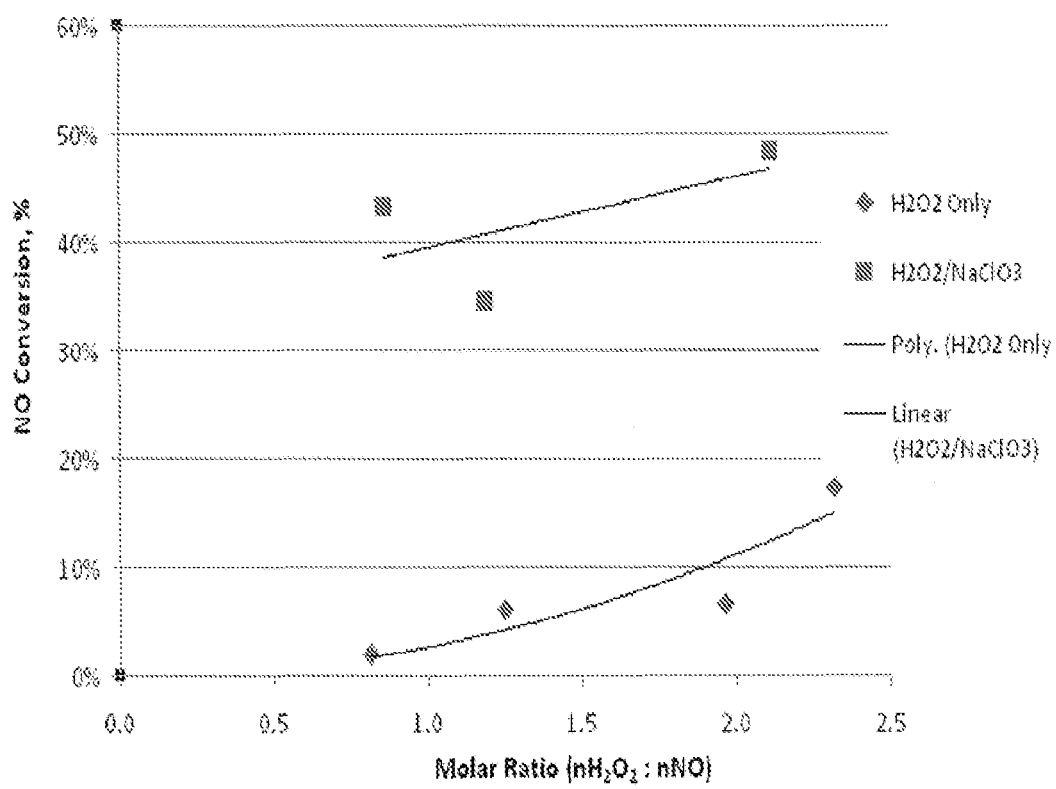

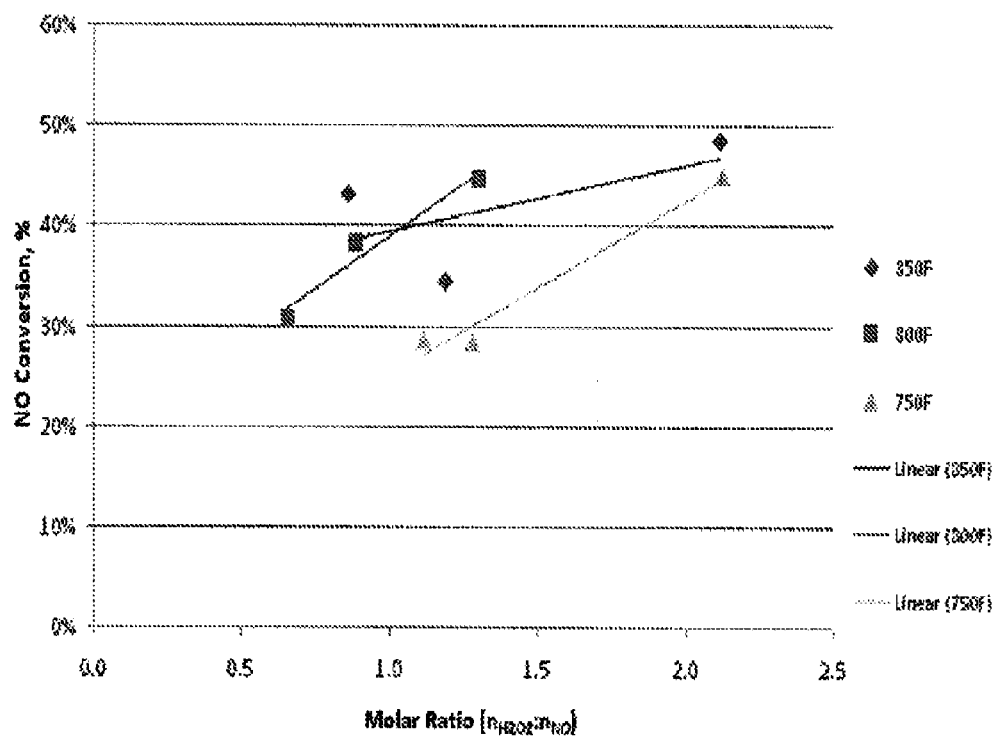

ACTIVATION OF REACTIVE COMPOUND WITH CATALYST

CROSS REFERENCE TO RELATED APPLICATIONS

The present application is a National Stage application under 35 U.S.C. §371 and claims priority from International patent application No. PCT/US2010/043733 filed Jul. 29, 2010, which claims priority from provisional U.S. patent application No. 61/262,457 filed on Nov. 18, 2009 and from Australian patent application No. 2009903603 filed Aug. 3, 2009.

FIELD OF THE INVENTION

The present invention relates to the catalytic activation of hydrogen peroxide and other reactive compounds and more particularly to the catalyzed activation of hydrogen peroxide for treatment of contaminants in a stationary source combustion flue gas stream.

BACKGROUND OF THE INVENTION

Hydrogen peroxide ($H_2O_2$) is a well-known chemical having strong oxidizing properties and is usually sold in aqueous solution. Aqueous hydrogen peroxide is available in a wide range of concentrations and has a variety of commercial applications, as a disinfectant, antiseptic, bleaching agent, oxidizer (including in chemical reactions), and as a propellant (e.g., in rocketry). A noteworthy characteristic of hydrogen peroxide is that its decomposition byproducts are innocuous.

Hydrogen peroxide may undergo decomposition either in the vapor phase or condensed phase, e.g., in aqueous solution, resulting in decomposition products of oxygen gas and water. The overall decomposition reaction is as follows:

$$H_2O_2 \rightarrow H_2O + \tfrac{1}{2}O_2 \uparrow \qquad (1)$$

One developing end-use application of hydrogen peroxide is in the field of air pollution control, in the treatment and removal of contaminants present in flue gas streams from stationary combustion sources, e.g. electric utility power plants that utilize fossil fuels.

Combustion of fuels such as coal, coke, natural gas or oil typically results in the presence of pollutants in the combustion flue gas stream resulting from the combustion process or derived from impurities present in the fuel source. Electric utility power plants that burn coal are a significant source of such combustion process air pollutants, but other stationary fuel-burning facilities such as industrial boilers, waste incinerators, and manufacturing plants are also pollution sources.

The primary air pollutants formed by these stationary high temperature combustion sources are sulfur oxides (e.g., $SO_2$ and $SO_3$), also called $SO_X$ gases, and nitrogen oxides, also called $NO_X$ gases, both of which are acid gases. Other combustion pollutants of concern in these combustion flue gases include other acid gases such as HCl and HF, Hg (mercury), $CO_2$ and particulates. In addition, residual amounts of unreacted ammonia ($NH_3$), used in the treatment of flue gas $NO_X$ in selective catalytic reduction (SCR) and selective non-catalytic reduction (SNCR) systems, is another contaminant of concern in combustion flue gas streams. These individual pollutant components from stationary combustion sources have been subject to increasingly more stringent regulatory requirements over the past decades, and emission standards are likely to be tightened in the future.

Aqueous hydrogen peroxide has been proposed for various applications in the treatment of combustion flue gas streams for removal of contaminants. However, there is still a need for air pollution control treatment procedures that utilize hydrogen peroxide in a highly efficient manner.

The present invention provides an air pollution control method for the effective control of flue gas stream contaminants, particularly $NO_X$ and Hg and residual ammonia (in SCR-treated or SNCR-treated combustion flue gas streams), utilizing activated hydrogen peroxide that is introduced as an oxidizing reactant into the flue gas stream. The novel hydrogen peroxide activation system of this invention is not disclosed or suggested in prior art treatments for abating $SO_X$, $NO_X$ and other gaseous contaminants in combustion flue gas streams.

U.S. Pat. No. 4,213,944 of Azuhata et al. (Hitachi) discloses a process for removing nitrogen oxides from a hot gas stream containing the same by adding a reducing agent, preferably ammonia, and hydrogen peroxide into hot gas stream at an elevated temperature of 400° C.-1200° C. to decompose the nitrogen oxides to nitrogen gas and water. The hydrogen peroxide is added concurrently with the ammonia and is said to increase the activity of the ammonia, particularly at gas temperatures of 400° C.-800° C., by decomposing the ammonia to make it reactive with the $NO_X$. Sufficient hydrogen peroxide is added with the ammonia so that excess unreacted ammonia is also decomposed.

U.S. Pat. Nos. 5,120,508 and 4,783,325 of Jones (Noell) disclose methods of converting NO to $NO_2$ in a flue gas stream by injecting a gas containing a peroxyl initiator and oxygen into the NO-containing gas stream. The peroxyl initiator is preferably propane but may also be other hydrocarbons or hydrogen peroxide or hydrogen. The resultant $NO_2$-containing gas stream is then treated in an absorption section to remove $NO_X$ and $SO_X$ with a dry sorbent such as nahcolite or trona, the dry sorbent being captured in a baghouse before the treated gas stream is discharged into the atmosphere.

U.S. Pat. No. 5,670,122 of Zamansky et al. (Energy & Environmental Research) discloses a method for removing NO, $SO_3$, CO, light hydrocarbons and mercury vapor (Hg) from combustion flue gas by injecting into the gas stream atomized droplets of either hydrogen peroxide or a mixture of hydrogen peroxide and methanol, to convert the respective gas contaminants to $NO_2$, $SO_2$, $CO_2$ (for the CO and light hydrocarbons) and HgO. The treatment is carried out at a gas temperature of about 377° C. to about 827° C., and the reaction products are subsequently removed in a downstream scrubbing operation. The treatment also may be carried out in combination with SNCR $NO_X$ reduction technology, with the SNCR-treated combustion gas stream being treated downstream with the $H_2O_2$ or $H_2O_2/CH_3OH$ injection treatment.

U.S. Pat. No. 6,645,450 of Stoltz et al. (Steen Research) discloses a method of controlling odors and noxious components, e.g., in effluent gas streams from food processing plants, by treating the gaseous effluent stream in a wet scrubber system with aqueous hydrogen peroxide and an additive, preferably aqueous ferrous sulfate solution, that serves to catalyze the rapid decomposition of hydrogen peroxide into hydroxyl radicals.

U.S. Pat. No. 6,676,912 of Cooper et al. (NASA) discloses a method of removing NO from stationary combustion gas streams by injection of $H_2O_2$ into the gas stream to oxidize NO to $NO_2$ and $HNO_3$ and $HNO_2$, which species are more readily recovered via aqueous wet scrubbing. The nitrogen acids and residual $NO_2$ are then removed via wet scrubbing with water or an aqueous alkaline medium or via passage of the flue gas stream through a particulate alkaline sorbent in a baghouse. The method may optionally include a preliminary flue gas desulfurization scrubbing step to remove $SO_2$, prior to the $H_2O_2$ injection.

U.S. Pat. No. 6,793,903 of Parrish et al. (NASA) and U.S. Pat. No. 6,955,799 of Parrish et al. (NASA) disclose methods of oxidizing nitric oxide (NO) into nitrogen dioxide ($NO_2$) by the high temperature decomposition of hydrogen peroxide into hydroxyl (HO.) and hydroperoxyl (HOO.) oxidative free radicals. A hydrogen peroxide solution is impinged onto a heated surface in a stream of nitric oxide, where the hydrogen peroxide decomposes to produce the oxidative free radicals. The heated surface is preferably coated with a catalytic material, e.g., Fe(II or III), Cu (II), Cr(II), Pt black, Ag, Pd (col. 3, lines 27-52).

In the method of Parrish et al. '799, the heated surface may either be coated with a catalytic material or may contain a solution or dispersion of a catalytic or reactive material. In the latter embodiment, the hydrogen peroxide is added to an aqueous solution or dispersion containing a salt or metal oxide that decomposes hydrogen peroxide to produce water and oxygen (col. 4, lines 33-60). The resultant oxygen that results from the decomposition of hydrogen peroxide has a low solubility in water and is released from the solution/dispersion into the nitric oxide stream to oxidize the NO to $NO_2$ (col. 4, lines 33-60 & col. 5, lines 16-36).

U.S. Statutory Invention Disclosure No. H1948H of Rusek et al. (U.S. Navy) discloses a method, applicable to hydrogen peroxide-fueled rocket thrusters, of decomposing hydrogen peroxide that is flowed over a fixed bed catalyst containing a $H_2O_2$— catalytically-active compound containing a transition metal cation mixed with an alkaline promoter. A preferred catalyst is tetravalent manganese with $Na^+$ or $K^+$ ions as the alkaline promoter, the catalyst being calcined and carried on an inorganic polar substrate.

U.S. Patent Publication No. 2004/0197252 of Parrish et al. (NASA) discloses the conversion of nitric oxide (NO) in a gas stream into nitrogen dioxide ($NO_2$) using concentrated hydrogen peroxide that is fed as a monopropellant into the gas stream via a catalyzed (rocket) thruster assembly. The catalyst, preferably a mixed catalyst of molybdenum oxides and manganese oxides on a catalyst support mounted in the thruster nozzle, decomposes the hydrogen peroxide into hydroxyl ions ($OH^-$) and/or hydroperoxy ions ($OOH^-$) which react with the nitric oxide in the gas stream.

U.S. Patent Publication No. 2008/0213148 of Parrish et al. (NASA) discloses a method of reducing $NO_X$ emissions from flue gas streams, using a gaseous chlorine dioxide treatment step and at least one aqueous hydrogen peroxide scrubbing solution treatment step. In this invention, the chlorine dioxide treatment step serves primarily to oxidize NO to $NO_2$.

U.S. Patent Publication No. 2008/0241030 of Parrish et al. (NASA) discloses a method of reducing emissions from flue gas streams, using multiple aqueous hydrogen peroxide scrubbing treatment steps and an intermediate gaseous chlorine dioxide treatment step, to treat $NO_X$—, $SO_X$— and heavy metal-containing flue gas streams. The gaseous chlorine dioxide treatment is used to remove heavy metals such as mercury from the flue gas stream, as well as any NO that is not previously oxidized by the first aqueous hydrogen peroxide scrubbing step.

Chlorine dioxide, mentioned in the above-noted two Parrish et al. patent publications, is a strong oxidizing agent generally used in water treatment and pulp bleaching. Hydrogen peroxide has been used in the preparation of chlorine dioxide, as described in the following two patent references.

U.S. Pat. No. 2,332,181 of Soule (Mathieson Alkali Works) discloses that chlorine dioxide ($ClO_2$) may be formed by the reaction in an acidic medium of a metal chlorate, e.g., sodium chlorate, and hydrogen peroxide, the latter functioning as a reducing agent.

U.S. Patent Publication No. 2003/0031621 of Gravitt et al. discloses an improvement in the production of chlorine dioxide, in which hydrogen peroxide and aqueous alkali metal chlorate, in the presence of a mineral acid, are sprayed into a spherical reaction chamber to form a foam that promotes the efficient production of chlorine dioxide. The chlorine dioxide is recovered from the reaction apparatus, e.g. in a stripper column.

The present invention provides a highly efficient means for activating hydrogen peroxide, particularly for its reaction with contaminants present in combustion flue gas streams. The invention is also useful for the catalytic activation or reaction of other reactive compounds, as described in the specification below.

SUMMARY OF THE INVENTION

In accordance with the present invention, a method is provided for catalyzing a reactive compound which comprises atomizing concurrently into a spray of droplets (i) a reactive compound contained in a first liquid and (ii) a catalyst contained in a second liquid, wherein the catalyst is capable of catalyzing a reaction involving the reactive compound; and volatilizing liquid from the atomized droplets to promote contact of the reactive compound with the catalyst and facilitate a catalyzed reaction of the reactive compound.

Another embodiment of the present invention is a method of activating hydrogen peroxide which comprises contacting atomized droplets of concentrated aqueous hydrogen peroxide in a gas stream with a particulate hydrogen peroxide catalyst entrained in the gas stream, for a period of time sufficient to activate the hydrogen peroxide.

Yet another embodiment of the present invention is a method of activating hydrogen peroxide which comprises concurrently atomizing into a spray of aqueous droplets (i) concentrated aqueous hydrogen peroxide and (ii) a hydrogen peroxide activation catalyst contained in an aqueous liquid; and evaporating water from the atomized droplets to promote contact of the hydrogen peroxide with the activation catalyst and activate the hydrogen peroxide.

Still another embodiment of the present invention is a method for activating hydrogen peroxide which comprises concurrently atomizing into a spray of droplets (i) concentrated aqueous hydrogen peroxide and (ii) a hydrogen peroxide activation catalyst dissolved in an aqueous liquid, the atomization being effected by using a spray nozzle having separate liquid channels for the aqueous hydrogen peroxide stream and for the activation catalyst stream and at least one fluidizing gas channel for an atomizing gas stream for atomizing the liquid streams; and evaporating water from the atomized droplets to promote contact of the aqueous hydrogen peroxide with the activation catalyst and activate the hydrogen peroxide.

Another aspect and embodiment of the present invention is a method for treating contaminants in a gas stream which comprises concurrently atomizing into a spray of aqueous droplets (i) a concentrated aqueous hydrogen peroxide solution and (ii) a hydrogen peroxide activation catalyst contained in an aqueous liquid; introducing the droplet spray into a gas stream containing contaminants; evaporating water from the droplets to promote contact of the hydrogen peroxide with the activation catalyst for activation of the hydrogen peroxide; and providing sufficient residence time in the gas stream for reaction of the activated hydrogen peroxide with one or more of the contaminants in the gas stream.

BRIEF SUMMARY OF THE DRAWINGS

FIG. 1 shows the results of two related studies described in the Example, the first of which used hydrogen peroxide alone (for comparative purposes) and the second of which used hydrogen peroxide activated with sodium chlorate ($NaClO_3$) in the method of this invention, in a treatment of NO-containing combustion flue gas. FIG. 1 shows NO percentage conversions as a function of several $H_2O_2$:NO mole ratios, using either $H_2O_2$ alone or $H_2O_2$ activated with $NaClO_3$ catalyst.

FIG. 2 shows the results of other studies described in the Example, in which hydrogen peroxide activated with sodium chlorate in the method of this invention was used in the treatment of NO-containing combustion flue gas, at three different flue gas treatment temperatures. FIG. 2 shows NO percentage conversions as a function of several $H_2O_2$:NO mole ratios, at the three flue gas temperatures.

DETAILED DESCRIPTION OF THE INVENTION

Overview of Invention; Advantages

The present invention is directed to a method for the highly efficient catalyzed reaction of a reactive compound, atomized in a carrier liquid into a spray of droplets and contacted with concurrently atomized catalyst in intimate admixture in the droplet spray.

In the present invention, the reactive compound, contained in atomized droplets, is intimately contacted with the catalyst in the droplet spray. This may be accomplished, in one aspect of the invention, by contacting the atomized reactive compound-containing droplet spray with the catalyst in a similar dispersed form. In a preferred embodiment, the atomized spray of droplets containing the reactive compound is contacted with catalyst that is also entrained in the droplet spray.

Such intimate contact in the atomized droplet spray, between the reactive compound-containing droplets and the catalyst, may be accomplished by concurrently atomizing into a droplet spray (i) reactive compound contained in a first liquid (first carrier liquid or solvent) and (ii) catalyst contained in a second liquid (second carrier liquid or solvent). Such a concurrent atomization ensures that the atomized droplets become intimately admixed or that droplets are formed containing both reactive compound and catalyst, facilitating contact with each other in the droplet spray and promoting a catalyzed reaction of the reactive compound.

The atomization of the reactive compound and of catalyst in their respective carrier liquids is preferably carried out in a manner that results in mixing of the two such that droplets of the two coalesce and/or such that droplets are formed at the nozzle during atomization containing both reactive compound and catalyst. The method of this invention is particularly suited for the activation of hydrogen peroxide, as the reactive compound, which is catalytically activated using a hydrogen peroxide activation catalyst.

The atomized droplets containing catalyst in the second liquid carrier preferably contain the catalyst dissolved therein, as a solution. Alternatively, the atomized catalyst-containing droplets may be droplets that contain the catalyst in a suspension or as partially solubilized catalyst.

An additional aspect and embodiment of this invention involves volatilizing liquid from the atomized droplets, further promoting efficient contact between the reactive compound in the atomized droplets and the catalyst. In a preferred embodiment, the volatilization or evaporation of liquid from the droplets is sufficient to remove carrier liquid from the atomized droplets containing catalyst to yield catalyst in a solid phase, e.g., as a particulate solid having a very fine particle size. In this latter embodiment, the reactive compound-containing droplets are then contacted with the particulate catalyst solids also entrained in the atomized droplet spray, facilitating a highly efficient heterogeneously catalyzed reaction or activation of the reactive compound.

The present invention is particularly useful for the activation of concentrated aqueous hydrogen peroxide, using a hydrogen peroxide activation catalyst. The activation of hydrogen peroxide in this invention results in the formation of free radicals, e.g., hydroxyl radicals that are extremely strong oxidizing agents, and has the advantage of activating hydrogen peroxide without resort to high temperatures.

The present invention is also noteworthy for reducing the likelihood of premature decomposition of hydrogen peroxide upstream, e.g., in piping, vessels or other confined spaces, leading to the possibility of equipment damage, since combination of the catalyst-containing liquid and aqueous hydrogen peroxide occurs concurrently with the atomization and formation of spray droplets. In addition, the mixing of the catalyst with the hydrogen peroxide in this manner, e.g, in the spray nozzle, immediately prior to their being introduced as a fine mist of droplets into a gas stream, ensures that the formation of hydroxyl ions occurs at the point where the oxidizing agent is needed for reaction and that premature breakdown of hydrogen peroxide is minimized.

The method of this invention is particularly useful for activating hydrogen peroxide that is employed in air pollution control applications, e.g., for treatment of $NO_X$-containing and/or Hg-contaminated flue gas streams from stationary combustion sources such as electric utility coal-fired power plants.

The method of this invention is also useful for catalyzing a reaction between two reactive compounds: the first reactive compound is atomized into droplets that are sprayed into a gas stream concurrently with atomization of droplets containing a catalyst (in separate droplets or in droplets containing the first reactive compound) that facilitates the reaction between the first reactive compound and a second reactive compound. The second reactive compound may either already be present in the gas stream or may likewise be concurrently atomized into droplets (along with atomization of the first reactive compound) that are intermixed with the atomized droplets containing the first reactive compound and containing the catalyst.

The inventive method may be carried out using one or more spray nozzles that use air or other gas as the atomizing gas, introduced via at least one gas channel in the nozzle, and separate liquid channels for atomization of the liquid streams, e.g., the liquid stream containing the first reactive compound, the liquid stream containing the catalyst, and, optionally, the liquid stream containing the second reactive compound.

There are several unexpected and surprising beneficial characteristics associated with the present invention, as applied to the activation of hydrogen peroxide and also for the catalyzed reaction of reactive compounds besides hydrogen peroxide. First, the inventive method enables the highly efficient and rapid activation of hydrogen peroxide and other reactive compounds at relatively low temperatures. Second, the invention provides usually efficient interaction between a finely-divided particulate catalyst having a high surface area-to-volume ratio and a reactive compound contacted with the catalyst, in a method that is noteworthy for its simplicity.

The catalyzed activation of hydrogen peroxide in the method of this invention typically improves the utilization efficiency of the hydrogen peroxide and reduces overall reaction residence time for the activated hydrogen peroxide, since activation of the hydrogen peroxide is rapid, making the peroxide immediately available for reaction in an end-use application, e.g., treatment of contaminants in a flue gas stream.

Atomization of Reactive Compound and Catalyst

In the present invention, the reactive compound in a first carrier liquid, e.g., concentrated aqueous hydrogen peroxide solution, is atomized or otherwise formed into a droplet spray. Likewise, the catalyst contained in a second carrier liquid is similarly atomized or otherwise formed into a droplet spray. The atomization of the reactive compound-containing liquid and of the catalyst-containing liquid is carried out concurrently (concurrently includes simultaneously, in the context of this specification) in the method of this invention.

The atomization is typically carried out using one or more spray nozzle devices. The terms atomized and atomization and the like used in this specification refer to the creation of a spray of droplets from a liquid. The terms nebulized and nebulization are synonyms for atomized and atomization and are often used in the context of a medical technology.

A preferred spray nozzle device for carrying out the concurrent atomization of the reactive compound-containing liquid stream and of the catalyst-containing liquid stream into a droplet spray is a design having separate channels for the reactive compound-containing liquid stream and for the catalyst-containing liquid stream and at least one fluidizing gas channel for an atomizing gas stream, e.g., air, for atomizing the liquid streams.

Such nozzle designs can atomize the separate liquid streams into a droplet spray that results in intimate mixing and contact of the droplets, such that the reactive compound is contacted with the catalyst, to effect a catalyzed reaction.

Alternatively or in addition, the nozzle design may provide intimate mixing of the liquid streams: from the channel(s) carrying reactive compound contained in a first liquid and from the channel(s) carrying catalyst contained in a second liquid, so that the two liquids mixing during atomization results in the formation of at least some and preferably a majority of droplets containing not only reactive compound but also the catalyst, facilitating contact between the two and a catalyzed reaction or activation in the droplet spray, particularly as liquid is evaporated from the droplets.

An example of a commercially-available nozzle design that may be employed in the method of this invention is Schlick Atomizing Technologies Series 946 and Series 0-56 Three-Substance (or Four-Substance) spray nozzles (Düsen-Schlick GmbH, D-96253 Untersiemau, Germany www.duesen-schlick.com); representative mean droplet sizes produced by such nozzles are stated to be in the range of 50-80 µm.

Alternatively, a variety of conventional atomization techniques and apparatus may be used in the method of this invention, including pneumatic atomization, hydraulic (or airless) atomization, and ultrasonic atomization. These atomization techniques can be used to produce a spray of droplets, in which the droplet population has a distribution of relatively fine droplet sizes.

Pneumatic atomization (also called air or gas atomization) involves a spraying technique in which an air stream or other gas stream is passed through a spray head apparatus along with a liquid (aqueous or organic) stream, e.g., aqueous hydrogen peroxide or another reactive compound contained in a liquid carrier in the method of this invention. The air or other gas stream provides the energy needed to effect atomization of the liquid containing a reactive compound (e.g., aqueous hydrogen peroxide) into a spray of droplets. Pneumatic atomization is well-known, widely-used spraying technique for atomization of liquid streams, and conventional pneumatic spraying apparatus may be employed in the present invention.

Pneumatic atomization is the preferred atomization technique for use in forming the droplets of aqueous hydrogen peroxide that are activated in the method of this invention. The multi-component spray nozzle designs described above are the most preferred pneumatic atomization devices for use in the present invention, whether for the catalytic activation of hydrogen peroxide or the catalyzed reaction of another reactive compound.

An advantage of pneumatic atomization is that the air stream used for atomization also promotes evaporation of water (or volatilization of other droplet carrier liquids) from the sprayed droplets. As a result of such evaporation or volatilization, the catalyst-containing droplets become depleted of the carrier liquid, exposing the catalyst to more efficient contact with the reactive compound-containing droplets. In referred embodiments of this invention, most or all of the carrier liquid is volatilized or evaporated from the catalyst-containing droplets. As a result, the catalyst-containing droplets thus yield catalyst in solid form, as finely-sized particulate catalyst that remains entrained in the droplet spray. The particulate catalyst in the droplet spray is readily and intimately contacted with the reactive compound-containing droplets, to facilitate a catalyzed reaction or activation of the reactive compound.

In the case where hydrogen peroxide is the reactive chemical, evaporation of water from the aqueous hydrogen peroxide droplets also results in further concentration of the aqueous hydrogen peroxide in the droplets, a factor that likewise promotes more efficient contact between the hydrogen peroxide and catalyst.

Hydraulic or airless atomization involves a spraying technique in which a liquid (aqueous or organic) solution stream (e.g., hydrogen peroxide or another reactive compound in an aqueous or organic solvent) is pumped under pressure through a spray nozzle orifice to effect atomization of the liquid into a spray of droplets. A hydraulic spray nozzle utilizes the kinetic energy of the sprayed liquid as the energy source to break the liquid into droplets. As a general rule, higher liquid pressures result in higher fluid velocities through the nozzle orifice and smaller drop diameters in the droplet spray, but some nozzle designs provide a constant droplet size distribution over are range of liquid flow rates.

The atomization of hydrogen peroxide or other reactive compound may also be carried out using a venturi device, e.g., a non-wetted throat venturi device in which the liquid containing the reactive compound is introduced (e.g., sprayed) into the venturi throat and atomized, using the energy from a bulk gas stream passing through the venturi throat. Venturi spray devices may have particular application in treating flue gas streams for removing contaminants that are contained in the flue gas stream.

Ultrasonic atomization involves a spraying technique in which a liquid solution stream (e.g., aqueous hydrogen peroxide or another reactive compound in an aqueous or inert solvent) is subjected to intense high frequency vibrations, e.g., about 20 kHz to about 50 kHz, to effect atomization of the liquid stream into a spray of droplets. Ultrasonic atomization usually produces a droplet spray having a narrow size distribution and low velocity spray.

The atomization procedure is preferably carried out to form liquid droplets that are relatively small in size, i.e., finely-sized droplets. The atomized droplets are typically not monosize, and the droplet population normally contains a range or distribution of droplet sizes.

The spraying parameters in the atomization procedure are typically adjusted to provide a droplet spray in which the droplets are generally spherical in shape and have a mean droplet diameter of less than about 100 μm. In this specification, references to mean droplet diameter refer to the size of the cross-section of the spherical droplet or, if the droplet is not spherical, a representative dimension, e.g., the largest cross-sectional dimension.

The atomization spraying parameters are preferably adjusted to provide a droplet spray in which the droplets mean droplet diameter of less than about 80 μm, more preferably less than about 60 μm and most preferably less than about 40 μm. In some situations, the characteristics of the atomized liquids and the spray device or nozzle design may permit even smaller mean droplet sizes, e.g., mean droplet diameter of less than about 20 μm. The smaller mean droplet diameters are preferred since their surface-to-volume ratios are greater, a factor that promotes efficient volatilization or evaporation of liquid from the droplets and improves the contact efficiency between the reactive compound-containing droplets and catalyst.

However, it should be recognized that larger droplet sizes than the preferred small droplets size ranges described above may be appropriate for some reactive compounds and/or catalysts. Such larger droplets may have mean droplet sizes larger than about 100 μm, up to about 500 μm or even larger, up to about 1000 μm.

Factors that affect or control atomized droplet size include atomizing air velocity and mass flow rate, atomizing air pressure (in pneumatic atomization), liquid stream flow rate and pressure, spray apparatus and design, and spray nozzle orifice design and diameter and aqueous hydrogen peroxide solution density (concentration) and viscosity. Multiple spray nozzles may also be used, e.g., to provide the desired flow rates and or spray droplet coverage.

Pneumatic atomization procedures readily provide atomized droplets having the preferred small droplet size characteristics. Small-sized droplet population may be formed, e.g., in pneumatic atomization, by increasing the relative flow rate or velocity of the atomization air stream as well as by increasing the ratio of air/liquid used in the atomization procedure.

Reactive Compound and Liquid Carrier

The reactive compound of this invention is a compound that can be reacted or activated catalytically by a suitable catalyst that facilitates the activation or reaction, during contact of the reactive compound and catalyst in an atomized droplet spray. The reactive compound can be an oxidizing agent or a reducing agent or other compound that is catalytically reactive. Combinations of reactive compounds, i.e., two or more reactive compounds that react catalytically, may also be employed in the method of this invention.

Hydrogen peroxide is the preferred reactive compound that is catalytically activated in a preferred embodiment of this invention, and the activation of hydrogen peroxide is discussed in more detail below.

The reactive compound, in the method of this invention, is atomized into a droplet spray. The reactive compound must therefore be capable of being contained in a carrier liquid and then be capable of being atomized into a spray of droplets, while contained in the carrier liquid.

The liquid carrier for the reactive compound is preferably a liquid that enables the reactive compound to be completely dissolved therein, e.g., providing a solution containing the reactive compound. Such solutions containing the reactive compound are desirably concentrated, preferably solutions that contain at least about 10 wt % of the reactive compound. In the case of hydrogen peroxide as the reactive compound, the solution should contain at least about 15 wt % $H_2O_2$.

Alternatively, the reactive compound may be a compound that can be at least partially solubilized in the carrier liquid or that can be dispersed in a carrier liquid, to provide a suspension containing finely-divided solid reactive compound, suitable for atomization into a droplet spray.

The reactive compound may also be a compound that is normally in a liquid state at ambient temperatures, obviating the need for a separate carrier liquid since the reactive compound itself serves as the carrier liquid for droplet formation during atomization.

In addition, the reactive compound in the atomized droplets may be a reactive compound that is catalytically reacted with one or more other reactants (i.e., additional reactive compounds) also present in the atomized droplets containing the multiple reactive compounds. Alternatively, the reactive compound in the atomized droplets may be catalytically reacted with one or more other reactants that are present in the gaseous environment into which the atomized droplets containing the reactive compound and catalyst are introduced, e.g., a flue gas stream or other gas stream containing other such reactants (i.e., additional reactive compounds).

The liquid carrier for the reactive compound may be water or other aqueous medium or may be an organic liquid. The liquid carrier is preferably inert with respect to the reactive compound. In addition, the liquid carrier should be relatively volatile, such that it is capable of being volatilized or evaporated from the droplets in the droplet spray, e.g., at ambient temperature or at elevated temperatures. Water is preferred as the liquid carrier for the reactive compound.

Catalyst for the Reactive Compound and Liquid Carrier

The catalyst involved in the present invention is selected to facilitate reaction or activation of the reactive compound. The catalyst must be capable of being contained in a carrier liquid (i.e., solubilized, dispersed or otherwise carried in the carrier liquid) and then being atomized into a spray of droplets, concurrently with atomization of the reactive compound.

The liquid carrier for the catalyst is preferably a liquid that enables the catalyst to be completely dissolved therein, e.g., providing a solution containing the catalyst. Such solutions containing the catalyst are preferably relatively concentrated, preferably solutions that contain at least about 5 wt % of the catalyst and, more preferably, at least 10 wt % of the catalyst.

Alternatively, the catalyst may be a compound that can be at least partially solubilized in the carrier liquid or that can be dispersed in a carrier liquid, to provide a suspension containing finely-divided solid catalyst particles, suitable for atomization into a droplet spray.

The liquid carrier for the catalyst may be water or other aqueous medium or may be an organic liquid. The liquid carrier for the catalyst (i.e., the second liquid carrier) is preferably the same as the liquid carrier for the reactive compound (i.e., the first liquid carrier). The liquid carrier for the catalyst is preferably inert with respect to the catalyst. In addition, the liquid carrier should be relatively volatile, such that it is capable of being volatilized or evaporated from the droplets in the droplet spray, e.g., at ambient temperature or at elevated temperatures. Water is preferred as the liquid carrier for the catalyst.

Atomized Droplets—Characteristics and Volatilization

There are several noteworthy aspects of the present invention that characterize the atomized droplet spray, in addition to the spray droplets containing reactant compound and catalyst, either in separate but intermixed droplets or together in individual droplets.

In this invention, the formation of droplets of a suitable catalyst contained in a liquid carrier is carried out concurrently, i.e., contemporaneously, with the atomization of the reactive compound contained in a liquid carrier, e.g., concentrated aqueous hydrogen peroxide. In a preferred embodiment, the catalyst and the reactive compound carried in liquid carriers are combined as an integral part of the formation and atomization of droplets being introduced into a gas stream.

In a preferred embodiment of this invention, the formation of droplets of catalyst contained in the second liquid carrier is carried out simultaneously with the atomization of the reactive compound in a first liquid in the same spray device, e.g. a pneumatic spray nozzle, which device has separate liquid channels for the two liquid streams. The atomization and droplet formation of the two liquid streams is preferably effected such that the air or gas stream(s) forms separate droplet sprays that are nevertheless in close proximity to each other and that become intermixed. The two droplet sprays are intermixed externally but proximate to the atomizing nozzle immediately after their formation at the spray nozzle.

In an alternative and highly preferred embodiment, the atomization and droplet formation of the two liquid streams in the spray device is effected in a manner which provides for mixing of the two liquid streams immediately after the streams leave their respective channels in the spray device, and just prior to and/or during atomization of the liquids into a droplet spray. This external liquid mixing in the spray device may optionally be promoted by the action of the atomizing air or gas stream. In this preferred atomizing embodiment, a significant portion of the atomized droplets contain both reactive compound and catalyst, thus facilitating their contact.

The atomization procedure of this invention is particularly suited for the activation of hydrogen peroxide, by the simultaneous atomization and formation of droplets containing both concentrated aqueous hydrogen peroxide and its catalyst in a single spray nozzle or in the same spray device, where the spray nozzle has separate liquid channels for the two liquid streams. The separation maintained for the aqueous hydrogen peroxide liquid stream and the catalyst-containing liquid stream in their respective liquid channels avoids the likelihood of premature catalytic activation of hydrogen peroxide within the spray apparatus, which can lead to a possible explosion hazard or damage to the spray apparatus.

Another characteristic of this invention is that the atomized spray droplets carrying the reactive compound and/or catalyst are finely-sized, i.e., very small droplet sizes that are less than about 100 μm (mean diameter), and most preferably less than about 20 μm (mean diameter). Such small droplet sizes promote more rapid volatilization or evaporation of the carrier liquid by virtue of the larger surface area per unit volume of the droplet.

For similar reasons, the reactive compound is desirably present in the carrier liquid in relatively concentrated form, reducing the amount of liquid in the droplets that presents a diffusion barrier between the reactive compound and the catalyst. The same can be said of the concentration of catalyst in its carrier liquid.

Another aspect of the present invention is the volatilization or evaporation of liquid from the atomized droplets. This volatilization or evaporation of liquid from the atomized droplets is carried out during or immediately after the atomization of the droplet spray.

The volatilization or evaporation of liquid from the atomized droplets serves several functions, that promote or enhance contact of the reactive compound with the catalyst and facilitate the catalyzed reaction or activation of the reactive compound. The removal of liquid from the atomized droplets, via volatilization or evaporation of liquid, serves to raise the concentration of reactive compound in the atomized droplets.

In a similar manner, the removal of liquid from the atomized droplets also raises the concentration of catalyst in the atomized catalyst-containing droplets. In a preferred embodiment of this invention, the volatilization or evaporation of liquid from the catalyst-containing droplets is carried to the point where sufficient liquid is removed to cause the catalyst to precipitate from solution and be available (for contact with the reactive compound) as a solid compound, e.g., as a finely-divided particulate solid.

The volatilization or evaporation of liquid from the atomized droplets is enhanced by judicious temperature selection and is desirably carried out at a temperature of at least about 100° F. In situations where the carrier liquid is an aqueous liquid or water alone, the volatilization or evaporation of water from the atomized droplets is preferably carried out at a temperature of at least about 200° F. Preferably the volatilization or evaporation of liquid from the atomized droplets is carried out at a temperature in the range of about 200° F. to about 1000° F.

The volatilization or evaporation temperatures, it should be noted, are typically measured as the temperature of the gaseous environment or gas stream into which the atomized droplets are introduced. The internal temperature of the droplets, and of the reactive compound and/or catalyst carried inside the droplets (and not at the droplet surface), are not necessarily the same as the temperature of the surrounding gas or gas stream and can be significantly less, assuming that the carrier liquids used in the droplet formation were at ambient temperature.

One factor which affects the volatilization or evaporation temperature employed in the method of this invention is the heat requirement for volatilization or evaporation of liquid from the atomized droplets. An aqueous medium or water used as the liquid carrier (for the atomized droplets) typically requires the use of higher temperatures for evaporation of the liquid than if the choice of liquid carrier were a volatile organic solvent.

A noteworthy characteristic of the present invention is its ability to provide an efficient catalyzed reaction involving the reactive compound and the catalyst at relatively low temperatures. The method of this invention promotes highly efficient contact between the reactive compound and the catalyst in a manner that facilitates an expeditious catalyzed reaction or activation involving the reactive compound. The contact between the atomized reactive compound and the catalyst may be carried at relatively low temperature, even at ambient temperature (about 50-70° F.) depending of course on the identity of the reactive compound involved.

However, the heat requirements for volatilization or evaporation of the carrier liquid from the atomized droplets, to promote effective contact between the reactive compound and catalysts, usually necessitates a gaseous environment with a temperature of at least about 100° F. Preferably, the temperature of the gaseous environment or gas stream is at lest about 200° F. and, more preferably, at least about 300° F., to promote efficient volatilization or evaporation of liquid from the atomized droplets and to facilitate a catalyzed reaction or activation of the reactive compound.

Optional Formation of Solid Catalyst Particles

In a preferred embodiment of this invention, the volatilization or evaporation of the carrier liquid from the atomized catalyst-containing droplets is sufficient to form catalyst as a solid phase, by removing sufficient liquid from the catalyst-containing droplets to yield catalyst in the form of finely-divided particulate solids. In this preferred embodiment of the invention, the catalyst is present during its contact with the reactive compound in the form of a particulate catalyst solid, to facilitate the catalyzed reaction or activation of the reactive compound.

The particulate catalyst obtained from volatilization or evaporation of carrier liquid from the catalyst-containing droplets is preferably a particulate solid in finely-divided form, most preferably extremely fine-sized particles. The catalyst should have a relatively small particle size in order to maximize the surface-to-volume ratio, i.e., thereby enhancing the effectiveness of the gas-(catalyst) solid or liquid-(catalyst) solid interaction between the reactive compound and particulate catalyst solid.

The atomization procedure of this invention promotes the formation of finely-sized catalyst particulates, since the atomized catalyst-containing spray droplets are themselves finely-sized, and when liquid is volatilized from such finely-sized droplets the resultant particulate solids are extremely small in size.

The mean particle size of the catalyst solid formed from volatilization or evaporation of the catalyst-containing droplets is typically much less than about 100 μm. The mean particle size of the catalyst solid is preferably less than about 50 μm, more preferably less than about 20 μm, and most preferably less than about 10 μm. In addition, for particles having a more preferred mean particle size of 20 μm, substantially all (90% or more, by volume) of the particles are preferably less than about 30 μm in particle size. For particles having a most preferred mean particle size of 10 μm, substantially all (90% or more, by volume) are preferably less than about 20 μm in particle size.

The particulate catalyst, obtained as described above, is contacted with the reactive compound, to facilitate a catalytic reaction or activation of the reactive compound. The catalyzed reaction is typically a heterogeneous catalysis, in which the catalyst, in the form of a particulate solid, is contacted with the reactive compound.

Reaction/Activation Contact Time

In the present invention, the contact between the catalyst and reactive compound may occur in a number of ways, to effect the catalyzed reaction or activation of the reactive compound. The catalyst may be present in particulate (solid phase) form, as just described above, or may be present as catalyst contained in the liquid carrier. Likewise, the reactive compound may become contacted with the catalyst while the reactive compound is present in the atomized droplets, typically in a concentrated form (liquid having also been removed from the reactive compound-containing droplets via volatilization or evaporation) or may be present in a gaseous or vapor state.

The contact between the reactive compound and the catalyst is effected for a period of time sufficient to facilitate or allow the catalyzed reaction or activation to occur. This contact time may be less than a second (a fraction of a second) up to a few seconds (about 1 to about 60 seconds) but may be as much as a few minutes (e.g., more than 1 minute up to about 10 minutes), depending on the specific reactive compound and catalyst involved and whether they are in a solid, liquid or gaseous state. In the case of hydrogen peroxide, the activation reaction is typically very fast, on the order of a fraction of a second up to a few seconds Activation of Hydrogen Peroxide The catalytic activation of hydrogen peroxide is an especially preferred embodiment of the present invention and the discussion which follows describes this particular application of the inventive method.

Activation of Hydrogen Peroxide—Chemical Reactions

The present invention is directed to the catalytic activation of hydrogen peroxide, to form free radicals, since such free radicals are highly reactive and are one of the strongest known oxidants. The catalytic activation of hydrogen peroxide in this invention involves its dissociation or ionization into free radicals, which include hydroxyl (OH.) and hydroperoxyl (also called perhydroxyl) (OOH.) radicals. Exemplary activation reactions are believed to occur by the cleavage of either an O—H bond or an O—O bond in the hydrogen peroxide molecule, as follows:

$$H_2O_2 \rightarrow 2OH. \qquad (2)$$

$$H_2O_2 \rightarrow OOH. + H. \qquad (3)$$

Other reactions involving hydrogen peroxide include its decomposition reaction, but this decomposition reaction per se is not the objective of the activation method of this invention. Decomposition of hydrogen peroxide results in the decomposition products of oxygen gas and water, and the overall reaction proceeds as follows, as mentioned previously:

$$H_2O_2 \rightarrow H_2O + \tfrac{1}{2}O_2 \uparrow \qquad (1)$$

The precise mechanism of the decomposition reaction is not fully understood but is believed to involve the formation of free radicals, e.g., OH. and OOH. (OH$^-$ and OOH$^-$).

The activation of hydrogen peroxide resulting in the formation of hydroxyl radicals is the main breakdown mechanism for hydrogen peroxide at high temperatures, e.g., above about 750° F. At lower temperatures, e.g., below about 750° F., hydrogen peroxide tends to break down to form water and oxygen, e.g., according to reaction (1), and the oxidizing efficiency utilizing hydroxyl radicals is consequently reduced.

As mentioned above, the focus of the hydrogen peroxide activation method of this invention is the direct catalytic formation of free radicals, by contacting concentrated aqueous hydrogen peroxide in atomized droplets with a suitable catalyst. The activation method of this invention method is particularly suited for enhancing the formation of hydroxyl radicals at lower temperatures, e.g., below about 750° F., than have typically been used in the prior art, thereby enhancing the oxidation capability of hydrogen peroxide.

Hydrogen Peroxide Concentration

The hydrogen peroxide employed in this preferred embodiment of the invention is an aqueous solution of hydrogen peroxide that may have a wide range of solution concentrations, but the aqueous hydrogen peroxide is desirably concentrated with respect to its $H_2O_2$ content.

Aqueous hydrogen peroxide solutions used in the present invention should contain at least about 10 wt % $H_2O_2$, preferably at least about 15 wt % $H_2O_2$, more preferably at least about 20 wt % $H_2O_2$., and most preferably at least about 35 wt % $H_2O_2$. Aqueous hydrogen peroxide solutions with these concentrations, suitable for use in this invention, are readily available from commercial suppliers as stabilized $H_2O_2$ solutions.

Highly concentrated aqueous hydrogen peroxide solutions (significantly above 50 wt % $H_2O_2$) may be used in this invention, but concentrations of aqueous $H_2O_2$ above about 50 wt % $H_2O_2$ require stringent handling and safety measures, a factor that favors the use of concentrated aqueous hydrogen peroxide solutions containing no more than about 50 wt % $H_2O_2$.

The concentration range for the aqueous hydrogen peroxide solutions utilized in this invention should have a concentration in the range of about 10 wt % $H_2O_2$ to about 70 wt % $H_2O_2$ and preferably should have a concentration in the range of about 20 wt % $H_2O_2$ to about 50 wt % $H_2O_2$.

Hydrogen Peroxide Activation Catalyst

The activation of hydrogen peroxide in the method of this invention involves contacting atomized droplets of hydrogen peroxide with an activation catalyst. The catalyst is introduced into contact with the atomized droplets containing hydrogen peroxide by concurrent atomization of catalyst-containing droplets, in an intermixed droplet spray that facilitates contact between the hydrogen peroxide and catalyst.

Alternatively, the catalyst is introduced into the atomized droplets containing hydrogen peroxide by the intermixing of the two liquids, i.e., aqueous hydrogen peroxide and the catalyst-containing liquid, concurrently with the spraying and atomization to provide a droplet spray in which droplets contain both hydrogen peroxide and catalyst, thereby facilitating contact between the hydrogen peroxide and catalyst.

The activation catalyst is preferably a soluble compound, particularly catalysts that are fully soluble in the preferred liquid carrier, water or an aqueous solvent. The most preferred soluble catalysts are those that are completely soluble in water and that yield a relatively concentrated aqueous solution.

The aqueous solution containing dissolved activation catalyst desirably contains at least 5 wt % catalyst and, preferably, at least 10 wt % catalyst, and, more preferably, at least 20 wt % catalyst and, most preferably, at least 30 wt % catalyst. The upper concentration limit is normally constrained by maximum solubility limits for the activation compound, and this concentration limit can vary widely for different compounds, so the solubility concentration limits may be below the preferred minimum concentrations noted above.

In another aspect of the invention, the droplet spray containing either (i) droplets of aqueous hydrogen peroxide and droplets containing catalyst, or (ii) individual droplets containing both hydrogen peroxide and catalyst, is subjected to conditions that promote volatilization or evaporation of the liquid from the atomized droplets, to enhance contact between the hydrogen peroxide and catalyst.

This aspect of the invention is facilitated by the use of an aqueous liquid carrier and by subjecting the atomized droplets to elevated temperature conditions, e.g., above about 200° F. Evaporation of water from the aqueous droplets further concentrates the hydrogen peroxide in the $H_2O_2$-containing aqueous droplets and likewise concentrates the solubilized catalyst.

In a preferred embodiment of this invention, the activation catalyst is converted via evaporation of the catalyst-containing droplets into the form of a particulate solid (after atomization of the aqueous hydrogen peroxide and aqueous catalyst solution and when the hydrogen peroxide is contacted with the activation catalyst), and the preferred catalyst particles are relatively small in size, providing a large surface area to volume of catalyst, which facilitates activation of the hydrogen peroxide contacted with the particulate activation catalyst.

In a preferred embodiment, the evaporation of water from the catalyst-containing aqueous droplets is preferably sufficient to yield a solid-phase catalyst, in the form of catalyst particles.

The activation of hydrogen peroxide in the method of this invention is effected by the contact of the hydrogen peroxide with the activation catalyst. While not wishing to be bound to any particular theory or mechanism of action, the inventors believe that activation of the hydrogen peroxide occurs most effectively with $H_2O_2$, in the gaseous or vapor state, being contacted with the activation catalyst in the form of a particulate solid, also entrained in the gas stream in which the hydrogen peroxide is being activated. For this reason, atomized droplets formed from highly concentrated aqueous hydrogen peroxide are preferred since $H_2O_2$ may more readily diffuse to the surface of the droplets and become vaporized, with less water needing to be evaporated or otherwise removed from the atomized droplets to concentrate the $H_2O_2$ further.

A hydrogen peroxide catalyst, in contact with hydrogen peroxide, readily activates the hydrogen peroxide, particularly at temperatures above about 200° F. The hydrogen peroxide catalyst is preferably contacted with the hydrogen peroxide droplets in a gaseous environment having a temperature in the range of about 200° F. to about 850° F., more preferably about 200° F. to about 650° F.

The hydrogen peroxide activation catalyst used in the present invention may be selected from the various catalytic compounds, including metals and metal ions, known to exhibit catalytic activity with respect to hydrogen peroxide. See, e.g., Kirk-Othmer *Encyclopedia of Chemical Technology*, "Hydrogen Peroxide," Wiley, vol. 13 (2001), Section 4.2 and Ullmann's *Encyclopedia of Industrial Chemistry*, "Hydrogen Peroxide," Wiley-VCH, (2005), Section 3.

The hydrogen peroxide activation catalyst used in the present invention is preferably a catalyst that is completely soluble in a solvent, the preferred solvent being an aqueous medium and most preferably water. The particulate catalyst is prepared by dissolution of a suitable catalyst in the preferred aqueous medium and next forming atomized droplets of catalyst dissolved in the aqueous solvent. In a preferred embodiment, the atomized catalyst-containing droplets are then evaporated to remove sufficient water from the droplets to yield or produce solid-phase catalyst in particulate form.

The hydrogen peroxide activation catalyst may include known hydrogen peroxide activation catalysts and are preferably activation catalysts that can be solubilized, preferably in an aqueous medium. Water-soluble activation catalysts are preferred, so that water or other aqueous solution can be used as the solvent. Particularly preferred are those activation catalysts that can be completely dissolved in water or other aqueous solvent, to produce a relatively concentrated solution. Combinations of hydrogen peroxide activation catalysts can also be employed, since some combinations provide enhanced catalytic activity.

Suitable catalysts for activating hydrogen peroxide in the present invention include the alkali metal and alkaline earth metal salts of oxychlorine, e.g., sodium chlorate ($NaClO_3$), lithium chlorate ($LiClO_3$), magnesium chlorate ($Mg(ClO_3)_2$), sodium perchlorate, ($NaClO_4$), sodium chlorite ($NaClO_2$) and the like. Other water-soluble salts that can be used as the catalyst include potassium permanganate ($KMnO_4$), potassium peroxymonosulfate ($2KHSO_5.KHSO_4.K_2SO_4$), bromates of sodium ($NaBrO_3$) or potassium ($KBrO_3$), and other like compounds.

The preferred catalysts for activating hydrogen peroxide in this invention are the water-soluble chlorate salts and chlorite salts, the preferred water soluble salts being sodium and potassium salts. Sodium chlorate ($NaClO_3$) is especially preferred as a catalytic activator for hydrogen peroxide, in the method of the present invention. These hydrogen peroxide catalyst salts have the advantage of providing the desired catalytic activation activity and of introducing no unwanted metal species into the environment being treated with activated hydrogen peroxide. Furthermore, atomized aqueous droplets containing these soluble catalyst salts can be subjected to evaporation to yield a particulate catalyst solids having very small particle sizes and being highly efficient activators for hydrogen peroxide in the method of this invention.

Other activation catalysts include compounds like oxides and hydroxides, e.g., of iron (e.g., $Fe_2O_3$), copper, manganese, magnesium, palladium, platinum, nickel, silver (e.g., AgO) and the like, as well as the catalytic metals or metal ions themselves, e.g., iron, copper, manganese, magnesium, chromium, nickel, silver, and chelates of such metals. Some of these metal catalysts, however, may be deemed to introduce an unwanted species into the environment being treated with activated hydrogen peroxide and for that reason may not be favored for use as the activator.

Preferred hydrogen peroxide activation catalysts from among the metals and metal salts include iron (particularly $Fe^{+2}$) salts, which may be more cost effective than other heavy metal or precious metal soluble salts. It should be noted, separate from the present invention, that an aqueous solution combining $Fe^{+2}$ and hydrogen peroxide is the well-known Fenton's reagent, developed in the 1890's and often used as an oxidizing agent in the treatment of organic contaminants in waste water streams.

Suitable hydrogen peroxide catalysts may also include compounds or metals that, in finely-divided particulate form, exhibit the desired catalytic activity with hydrogen peroxide. Such solid particulate catalyst compounds or metals may be suspended in an aqueous medium and the aqueous suspension formed into droplets, from which water is removed by evaporation to yield the particulate solid catalyst. The one constraint on this approach is that the suspended catalyst must have a size dimensions falling within the preferred particle size ranges noted above for the solid particulate catalyst that is contacted with the hydrogen peroxide.

The hydrogen peroxide activation catalyst is very efficient and may be employed in amounts that are relatively small compared to the hydrogen peroxide being activated. The hydrogen peroxide activation catalyst is preferably employed in amounts that are less than 1 mole catalyst per mole of hydrogen peroxide. For the preferred alkali metal soluble catalyst salts like sodium chlorate and sodium chlorite, the amount of catalyst employed may range from about 0.1 mole to about 0.5 mole catalyst compound per mole of hydrogen peroxide.

Notwithstanding the preferred amounts of hydrogen peroxide catalyst noted above, the sodium chlorate catalyst may be employed at relatively low amounts, relative to the amount of hydrogen peroxide being activated. Sodium chlorate in amounts of less than 0.1 mole per mole of hydrogen peroxide will provide enhanced formation of hydroxyl radicals from the hydrogen peroxide, via the activation method of this invention.

Activation Temperature

The method of the present invention is unique in that the activation of hydrogen peroxide may be carried out at relatively low temperatures, in contrast to prior art techniques in which hydrogen peroxide is activated at elevated temperatures. The activation method of this invention efficiently activates hydrogen peroxide at relatively low temperatures.

In preferred embodiments of the activation method of this invention, the atomized hydrogen peroxide is contacted with the activation catalyst at a temperature of at least about 200° F., and more preferably at least about 300° F., to facilitate activation of the hydrogen peroxide. The temperature range for activation of hydrogen peroxide by contact of the atomized aqueous hydrogen peroxide with the activator catalyst is fairly broad, e.g., about 200° F. to about 1000° F. The preferred range for activation of hydrogen peroxide in the method of this invention is about 200° F. to about 850° F., a more preferred range being about 200° F. to about 650° F.

The hydrogen peroxide activation method of this invention avoids one challenge to the activation of aqueous hydrogen peroxide with a catalyst, namely, that the catalyst cannot normally be incorporated into the aqueous hydrogen peroxide solution in advance of the time or point at which activated hydrogen peroxide is desired or needed since catalyzed activation occurs rapidly.

A particular advantage of the low temperature activation method of this invention is that the hydrogen peroxide may be readily atomized into a gas stream being treated, without special cooling provisions being necessary to avoid premature decomposition of the concentrated aqueous hydrogen peroxide in the atomization nozzles or in the associated piping network supplying such nozzles.

Still another advantage of activation method of this invention is that the hydrogen peroxide is activated at high temperatures, e.g., above about 650° F., with excellent efficiency in the formation of reactive hydroxyl radicals. This highly efficient catalytic activation of hydrogen peroxide at such high temperatures permits the use of lesser amounts of hydrogen peroxide than would otherwise be used at such high temperatures, in the non-catalyzed formation of hydroxyl radicals at such high temperatures, for reaction with a specific pollutant or other chemical species desired to be oxidized.

Applications for Activated Hydrogen Peroxide—Flue Gas Stream Treatment

The activation step in the method of this invention is achieved catalytically, by contacting atomized aqueous concentrated hydrogen peroxide with a hydrogen peroxide catalyst in an atomized droplet spray, to activate the hydrogen peroxide by forming free radicals. The activated hydrogen peroxide is useful for a variety of purposes, particularly oxidation reactions with other species.

The activation of hydrogen peroxide in this invention is highly useful for treatment and removal of contaminants present in gas streams, such contaminants including nitrogen oxides ($NO_X$) and mercury in gas streams, e.g., in combustion gas flue gas streams, that are eventually released into the atmosphere. Gas streams other than combustion gas flue gas streams are amenable to treatment in the method of this invention, for example, gas streams from waste incineration. Contaminants in gas streams from the use of alternative fuels such as biosolids (e.g., sewage sludge or other wastewater residual solids) may likewise be treated in the method of this invention.

Combustion flue gas streams exiting the combustion zone of a stationary source contain a variety of components that are desirably reduced or removed from the flue gas prior to its being discharged to the atmosphere, among which are the $NO_X$ (e.g., particularly NO) and Hg components which may be treated according one embodiment of the present invention. The precise composition of the combustion flue gas depends primarily on the nature of the fuel (e.g., coal (high/low sulfur, bituminous/anthracite), oil, coke or natural gas, etc.) and on the furnace and boiler design and operating parameters.

A representative flue gas stream obtained from combustion of high sulfur coal containing 2.5 wt % sulfur, burned using 10% excess air, has the composition shown in Table 1.

TABLE 1

Flue Gas Composition

| Component | Concentration: volume basis |
|---|---|
| $SO_2$ | 0.22% |
| $SO_3$ | 20 parts per million (ppm) |
| NO | 400 ppm |
| $NO_2$ | 60 ppm |
| $H_2O$ | 9% |
| $CO_2$ | 15% |
| Hg | 1 part per billion (ppb) |
| Other Gases | 76% |

The foregoing flue gas composition is simply meant to be illustrative of a typical combustion flue gas stream. The activated hydrogen peroxide of the present invention is versatile, being adapted to be used in the treatment of a variety of gaseous and particulate (solid or liquid) contaminants in a wide range of different flue gas compositions. The activated hydrogen peroxide of this invention is especially noteworthy for its usefulness in the retrofit or supplemental treatment of flue gas contaminants in existing air pollution control systems. One skilled in the art, however, will recognize that other useful end-use applications besides flue gas treatment are possible with this invention, which provides low temperature catalyzation of hydrogen peroxide for enhanced oxidative properties.

The activated hydrogen peroxide in the present invention is especially useful for targeting removal of two problematic flue gas stream components, i.e., $NO_X$ and Hg, before the flue gas is released into the atmosphere. Concentrations of $NO_X$ and Hg can be significantly reduced by treatment with hydrogen peroxide activated according to this invention, without resort to the high temperatures used in the prior art for activating hydrogen peroxide. The invention facilitates the efficient removal of these problematic pollutants using existing flue gas pollution control equipment and treating the flue gas at relatively low treatment temperatures using hydrogen peroxide activated according to this invention.

In addition, the present invention is useful for reducing the concentration of residual ammonia ($NH_3$) that remains unreacted in a flue gas stream treated with injected ammonia for $NO_X$ control via selective catalytic reduction (SCR) or selective non-catalytic reduction (SNCR) systems. Typical residual ammonia concentrations can be about 5-20 ppm (by volume) $NH_3$ in SNCR-treated flue gas streams and about 5-10 ppmv $NH_3$ in SCR-treated flue gas streams.

The hydrogen peroxide activation method of this invention provides activated hydrogen peroxide that is also highly reactive with other contaminants in combustion flue gas streams, e.g., sulfur trioxide ($SO_3$) or sulfur dioxide ($SO_2$) and other acid gases, but the target contaminants of primary interest are those mentioned above.

The hydrogen peroxide activation method may also be employed to provide activated hydrogen peroxide useful in the treatment of organic compounds that are present, as contaminants, combustion byproducts or reaction byproducts, in a combustion flue gas stream. Such organic compounds include propane, organic compounds used as the fuel source, and incompletely combusted byproducts such as phenols, benzenes, and other aromatic compounds, and the like.

Treatment Temperature and Residence Time

The hydrogen peroxide activation method may be carried out by selection of an appropriate treatment point, from the standpoint of flue gas temperature and contaminants present that are in need of treatment. The hydrogen peroxide activation is preferably carried out with flue gas stream temperatures ranging from about 200° F. to about 850° F. and, more preferably, from about 200° F. to about 650° F.

Residence time required for the activated hydrogen peroxide to be in contact with the contaminant-containing flue gas stream is normally very short, since the hydrogen peroxide is activated within a very short time. Residence times of a fraction of a second up to about 2 to about 3 seconds are normally sufficient.

Amount of Activated Hydrogen Peroxide for Reaction

The amount of hydrogen peroxide introduced into and contacted with the flue gas stream desirably provides at least a stoichiometric amount of hydrogen peroxide with respect to the amount of contaminant species in the flue gas stream that is being targeted for removal, e.g., NO or Hg or both. The reaction of hydrogen peroxide with NO and with Hg is believed to proceed by the following reactions:

$$H_2O_2 + NO \rightarrow NO_2 + H_2O \qquad (4)$$

$$H_2O_2 + Hg \rightarrow HgO + H_2O \qquad (5)$$

It should be noted that the amounts of hydrogen peroxide referred to in this specification are based on the amount of contaminant species targeted to be removed: if the flue gas stream contains 100 ppm NO and 50% of the NO is targeted for removal, then the amount of calcined hydrogen peroxide utilized is based on the stoichiometric amount required to remove 50 ppm NO (i.e., 50% of 100 ppm).

The amount of hydrogen peroxide employed may be less than a stoichiometric amount, e.g., about half of stoichiometric, but preferably provides at least about a stoichiometric amount, and more preferably at least about twice the stoichiometric amount, of hydrogen peroxide ($H_2O_2$) based on the amount of targeted species (e.g., NO, Hg or other species) to be removed from the flue gas stream. The amount of hydrogen peroxide introduced into contact with the targeted species may provide a significant stoichiometric excess, up to about ten times stoichiometric amount based on the amount of targeted species to be removed from the flue gas stream.

Injection Sites for Flue Gas Stream Treatment with Activated Hydrogen Peroxide

The present invention provides flexibility in the choice of flue gas stream sites for introduction and activation of the hydrogen peroxide, in the treatment of a stationary combustion flue gas stream. Since the hydrogen peroxide activation method of this invention does not require high temperatures (e.g., >800-900° F.) for activation, there are many downstream locations, where the flue gas has cooled or been subjected to heat recovery operations, available for highly efficient removal of flue gas contaminants from the flue gas stream.

Injection or introduction sites for activation of hydrogen peroxide according to this invention in flue gas stream ducting from an electric utility power plant could include, e.g., downstream of a SCR (selective catalytic reduction) or SNCR (selective non-catalytic reduction) treatment unit operation, upstream (hot side) or downstream (cool side) of a preheater heat exchange device, and either prior to or after other anti-pollution treatment unit operations (solids collection devices, desulfurization steps, etc.)

The contact between the hydrogen peroxide and particulate catalyst in the flue gas stream is facilitated by the entrainment or suspension of the particulate activation catalyst in the gas stream, during the activation of the hydrogen peroxide and its reaction with flue gas stream contaminants. The entrained catalyst may be readily captured in a solids collection device, such as a baghouse filter or electrostatic precipitator, which allows continued contact between the catalyst and the hydrogen peroxide in the gas stream passing through the solids collection device.

One skilled in the art will recognize, based on the foregoing disclosure, that the reactive compounds useful in the method of the present invention are not limited to hydrogen peroxide and to other peroxygen compounds. e.g., peracetic acid, that benefit from catalytic activation.

Suitable reactive compounds for use in this invention also include other compounds that can be carried in a liquid vehicle capable of being atomized into a spray of finely-sized droplets and any suitable catalyst (for catalyzing a reaction or activation including the reactive compound) that can also be carried in a liquid vehicle capable of being atomized into a spray of finely-sized droplets. The atomized catalyst-containing droplets must be susceptible to volatilization or evaporation of the carrier liquid to yield a finely-divided particulate catalyst that is contacted with the reactive compound to facilitate a catalyzed reaction involving the reactive compound.

The following non-limiting Example illustrates a preferred embodiment of the present invention.

EXAMPLE

The Example illustrates the application of a preferred embodiment of the present invention using activated hydrogen peroxide for the removal of $NO_X$ in a flue gas stream resulting from coal combustion.

The combustion flue gas stream contained about 205-245 ppm (volume) NO, prior to treatment of the flue gas with hydrogen peroxide. The NO conversion was measured by analysis of the flue gas stream NO and $NO_X$ concentration ($NO_X$ including both NO and $NO_2$), downstream of the treatment point, on the cold side of the air preheater prior to solids collection with an electrostatic precipitator.

The hydrogen peroxide employed was aqueous 50 wt % $H_2O_2$. The catalyst used was sodium chlorate ($NaClO_3$), and the $NaClO_3$ was employed as a 35 wt % $NaClO_3$ aqueous solution. The aqueous hydrogen peroxide and sodium chlorate were introduced as an atomized spray into the flue gas stream, the spray nozzle being mounted in the flue gas ductwork.

The spray nozzle contained separate liquid channels for the aqueous hydrogen peroxide solution and (when used) for the aqueous sodium chlorate solution, with air being used as the atomizing gas. The design of the nozzle provided for intimate mixing of the aqueous hydrogen peroxide solution and aqueous sodium chlorate (catalyst) solution at the nozzle chamber tip, just prior to atomization, such that atomized individual aqueous droplets likely contained both hydrogen peroxide and sodium chlorate.

Referring now to the Figures, FIG. 1 shows the results of two studies, the first using hydrogen peroxide alone and the second using hydrogen peroxide activated with sodium chlorate, in a treatment of NO-containing combustion flue gas. FIG. 1 shows the results as NO conversions as a function of several $H_2O_2$:NO mole ratios, using either $H_2O_2$ alone (for comparative purposes) or $H_2O_2$ activated with $NaClO_3$ catalyst.

In the studies for FIG. 1, the temperature of the flue gas stream was about 850° F., at the point the hydrogen peroxide was introduced into the NO-containing flue gas via spray nozzle atomization. The residence time (of the hydrogen peroxide in contact with the NO-containing flue gas stream) was kept constant, at about 1.4 second. The amount of sodium chlorate catalyst employed, with respect to the amount of NO in the flue gas stream, was maintained constant (despite the use of varying amounts of hydrogen peroxide) at a constant mole ratio of about 0.3 mole $NaClO_3$ per mole of NO.

As shown by the data in FIG. 1, the results for use of hydrogen peroxide alone (at mole ratios of 0.82, 1.25, 1.96 and 2.32 moles $H_2O_2$ per mole NO), indicate that percentage conversion of NO increased gradually with increasing mole ratios. However, relatively low NO conversions were obtained: less than 10% conversion except at the highest $H_2O_2$:NO mole ratio of 2.32 where less than 20% conversion was achieved.

The data in FIG. 1 show significantly increased NO conversions when the hydrogen peroxide was catalytically activated, using sodium chlorate that was concurrently atomized in aqueous droplets along with atomization of the aqueous hydrogen peroxide. The results in FIG. 1 show NO conversions ranging between ~33% to ~48% NO conversion at the three $H_2O_2$:NO mole ratios used (0.86, 1.19 and 2.12 moles catalyst-activated $H_2O_2$ per mole NO).

In another study and as shown in FIG. 2, the flue gas stream temperature was varied in a study of NO conversions using hydrogen peroxide again activated with sodium chlorate, in a treatment of the NO-containing combustion flue gas. FIG. 2 shows the results of this study, depicting NO conversions as a function of three $H_2O_2$:NO mole ratios, at three flue gas temperatures: ~750° F.; ~800° F.; and ~850° F. (this latter temperature being used in the FIG. 1 studies).

NO conversions at each of the three temperatures used were good, ranging from about 28% (obtained at the lowest temperature of ~750° F.) to about 49% (obtained at the highest temperature of ~850° F.). As shown by the data points in FIG. 2, there was measurable improvement in NO conversion achieved with increasing flue gas temperatures (activation temperatures) and with increased $H_2O_2$:NO molar ratios.

The studies reported in this Example and for which results are shown in FIGS. 1 and 2 demonstrate that a significant reactivity improvement (as measured by NO conversion in this Example) was achieved with catalytically-activated hydrogen peroxide, as compared with hydrogen peroxide used per se without catalytic activation under otherwise identical conditions.

It will be appreciated by those skilled in the art that changes could be made to the embodiments described above without departing from the broad inventive concept thereof. It is understood, therefore, that this invention is not limited to the particular embodiments disclosed but is intended to cover modifications within the spirit and scope of the present invention as defined by the appended claims.

What is claimed is:

1. A method for catalyzing a reactive compound which comprises atomizing concurrently into a spray of droplets separate streams of (i) a concentrated reactive compound contained in a first liquid and (ii) a catalyst contained in a second liquid, wherein the catalyst is capable of catalyzing a reaction involving the reactive compound; and volatilizing liquid from the atomized droplets to promote contact of the reactive compound with the catalyst and facilitate a catalyzed reaction of the reactive compound.

2. A method of activating hydrogen peroxide which comprises contacting atomized droplets of concentrated aqueous hydrogen peroxide in a gas stream with a particulate hydrogen peroxide activation catalyst entrained in the gas stream, for a period of time sufficient to activate the hydrogen peroxide.

3. A method of activating hydrogen peroxide which comprises concurrently atomizing into a spray of aqueous droplets separate streams of (i) concentrated aqueous hydrogen peroxide and (ii) a hydrogen peroxide activation catalyst contained in an aqueous liquid; and evaporating water from the atomized droplets to promote contact of the hydrogen peroxide with the activation catalyst and activate the hydrogen peroxide.

4. A method for activating hydrogen peroxide which comprises concurrently atomizing into a spray of droplets separate streams of (i) concentrated aqueous hydrogen peroxide and (ii) a hydrogen peroxide activation catalyst dissolved in an aqueous liquid, the atomization being effected by using a spray nozzle having separate liquid channels for the aqueous hydrogen peroxide stream and for the activation catalyst stream and at least one fluidizing gas channel for an atomizing gas stream for atomizing the liquid streams; and evaporating water from the atomized droplets to promote contact of the aqueous hydrogen peroxide with the activation catalyst and activate the hydrogen peroxide.

5. A method for treating contaminants in a gas stream which comprises concurrently atomizing into a spray of aqueous droplets separate streams of (i) a concentrated aqueous hydrogen peroxide solution and (ii) a hydrogen peroxide activation catalyst contained in an aqueous liquid; introducing the droplet spray into a gas stream containing contaminants; evaporating water from the droplets to promote contact of the hydrogen peroxide with the activation catalyst for activation of the hydrogen peroxide; and providing sufficient residence time in the gas stream for reaction of the activated hydrogen peroxide with one or more of the contaminants in the gas stream.

6. The method of claim 5 wherein the formation of the atomized spray of droplets of aqueous hydrogen peroxide and activation catalyst is carried out using a spray nozzle wherein air is the atomizing gas introduced via at least one gas channel in the nozzle and wherein the nozzle has separate liquid channels for atomization of the two liquid streams.

7. The method of claim 5 wherein the concentrated aqueous hydrogen peroxide has a concentration of at least 15% wt $H_2O_2$.

8. The method of claim 5 wherein the atomized droplets have a mean diameter smaller than about 100 um.

9. The method of claim 5 wherein the atomized droplets have a mean diameter smaller than about 60 um.

10. The method of claim 5 wherein the hydrogen peroxide activation catalyst is selected from the group consisting of metal oxides, metal hydroxides, metal ions, metals and metal chelates.

11. The method of claim 5 wherein the hydrogen peroxide activation catalyst is selected from the group consisting of water-soluble chlorate and chlorite salts.

12. The method of claim 5 which further comprises evaporating sufficient water from the atomized droplets containing the activation catalyst to yield catalyst in particulate form, to promote contact of the hydrogen peroxide with the catalyst and to effect a catalyzed activation of the hydrogen peroxide.

13. The method of claim 12 wherein the particulate catalyst has a mean particle size smaller than about 50 um.

14. The method of claim 12 wherein the particulate catalyst has a mean particle size smaller than about 20 um.

15. The method of claim 5 wherein the evaporation of water from the atomized droplets is carried out at a temperature of about 200° F. to about 1000° F.

16. The method of claim 5 wherein the atomized droplet spray is introduced into the flue gas stream at a point where the gas stream has a temperature of about 200° F. to about 850° F.

17. The method of claim 5 wherein the contaminants treated with the activated hydrogen peroxide are selected from the group consisting of $NO_x$, Hg, $SO_x$, $NH_3$, and organic compounds.

18. The method of claim 5 wherein the contaminants in the gas stream are gaseous contaminants.

19. The method of claim 5 wherein the gas stream is a stationary source combustion flue gas stream.

20. The method of claim 5 wherein the gas stream is a waste incineration gas stream.

* * * * *